US012649153B2

(12) United States Patent
Lammertyn et al.

(10) Patent No.: US 12,649,153 B2
(45) Date of Patent: Jun. 9, 2026

(54) ACTIVATION AND PRESSURE BALANCING MECHANISM

(71) Applicant: KATHOLIEKE UNIVERSITEIT LEUVEN, Leuven (BE)

(72) Inventors: Jeroen Lammertyn, Huldenberg (BE); Dries Vloemans, Wezenmaal (BE); Lorenz Van Hileghem, Steenhuffel (BE); Francesco Dal Dosso, Leuven (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 507 days.

(21) Appl. No.: 18/245,631

(22) PCT Filed: Sep. 17, 2021

(86) PCT No.: PCT/EP2021/075561

§ 371 (c)(1),
(2) Date: Mar. 16, 2023

(87) PCT Pub. No.: WO2022/058470

PCT Pub. Date: Mar. 24, 2022

(65) Prior Publication Data

US 2023/0330669 A1 Oct. 19, 2023

(30) Foreign Application Priority Data

Sep. 17, 2020 (GB) .................................... 2014687
Feb. 4, 2021 (EP) .................................... 21155186

(51) Int. Cl.
*B01L 3/00* (2006.01)

(52) U.S. Cl.
CPC ... *B01L 3/50273* (2013.01); *B01L 2200/0621* (2013.01); *B01L 2300/0883* (2013.01); *B01L 2300/123* (2013.01); *B01L 2300/165* (2013.01); *B01L 2400/0478* (2013.01); *B01L 2400/0688* (2013.01)

(58) Field of Classification Search
None
See application file for complete search history.

(56) References Cited

U.S. PATENT DOCUMENTS

| | | | | |
|---|---|---|---|---|
| 7,942,160 | B2 | 5/2011 | Jeon et al. | |
| 2016/0279632 | A1* | 9/2016 | Delamarche .......... | B01F 33/813 |

(Continued)

FOREIGN PATENT DOCUMENTS

| | | | |
|---|---|---|---|
| JP | H10132712 | A | 5/1998 |
| WO | 2008127191 | A1 | 10/2008 |

OTHER PUBLICATIONS

Dal Doss et al., "Creasensor: Simple technology for creatinine detection in plasma", Analytica Chimica Acta, vol. 1000, Nov. 17, 2017, pp. 191-198.

(Continued)

*Primary Examiner* — Henry H Nguyen
(74) *Attorney, Agent, or Firm* — Workman Nydegger

(57) ABSTRACT

In general, the disclosure relates to a fluid conduit device, such as microfluidic technique, with minimal operation. More specifically, the present invention relates to an activation and pressure balancing mechanism suitable for robust activation of fluid conduit devices.

11 Claims, 10 Drawing Sheets

(56) References Cited

U.S. PATENT DOCUMENTS

| | | | | |
|---|---|---|---|---|
| 2018/0345288 | A1* | 12/2018 | Belotserkovsky | F04B 19/006 |
| 2019/0314813 | A1* | 10/2019 | Doolan | B01L 3/50273 |

OTHER PUBLICATIONS

Kokalj et al., "Self-powered Imbibing Microfluidic Pump by Liquid Encapsulation: SIMPLE", Lab on a Chip, Royal Society of Chemistry, vol. 14, No. 22, Sep. 10, 2014, pp. 4329-4333.
Park et al., "Finger-actuated microfluidic device for the blood cross-matching test", Lab on a Chip, Royal Society of Chemistry, vol. 18., Mar. 21, 2018, pp. 1215-1222.
European Search Report from corresponding European Patent Application No. EP 21155186, Jul. 8, 2021.
International Search Report from corresponding PCT Application No. PCT/EP2021/075561, Nov. 30, 2021.

* cited by examiner

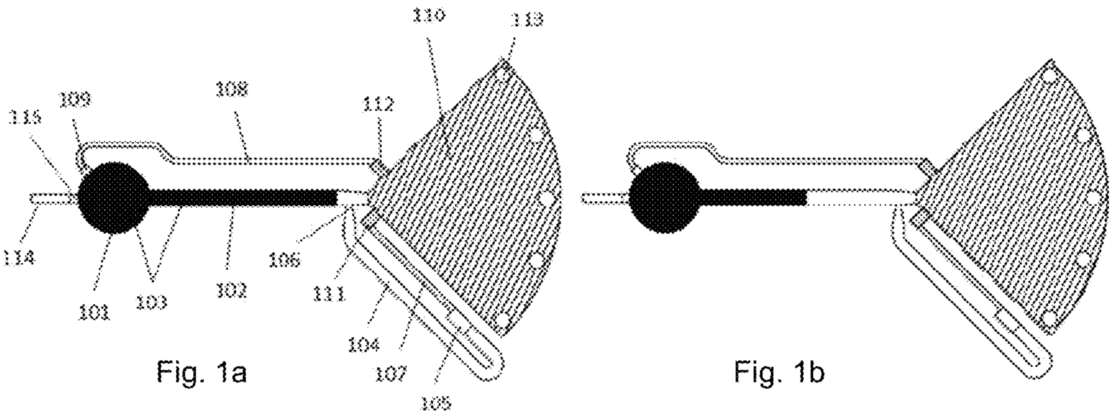
Fig. 1a Fig. 1b
Figure 1
Fig. 2a Fig. 2b Fig. 2c Fig. 2d
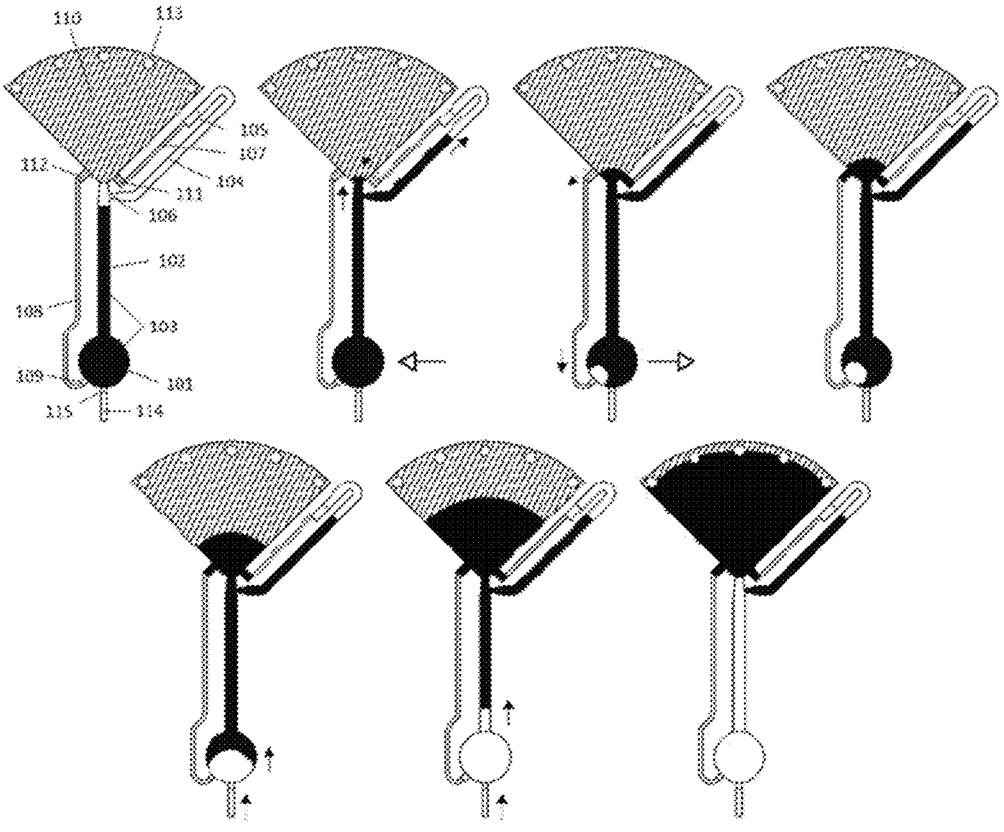
Fig. 2e Fig. 2f Fig. 2g
Figure 2

Fig. 3a
Fig. 3b
Fig. 3c
Fig. 3d
Fig. 3e
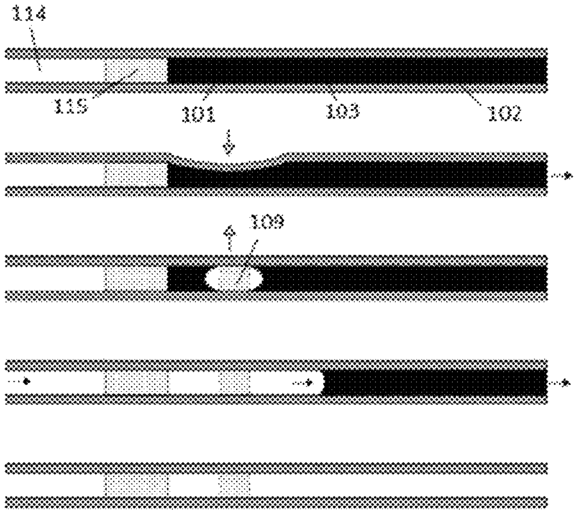
Figure 3
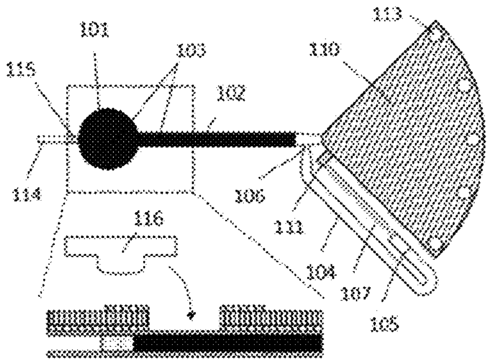
Fig. 4a
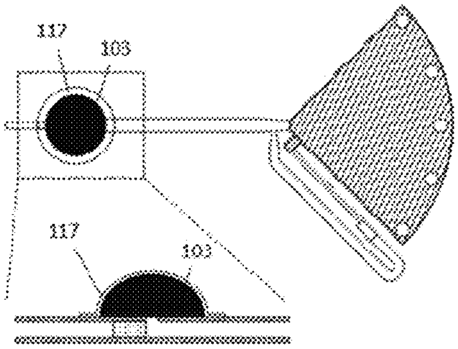
Fig. 4b
Figure 4

Fig. 8a
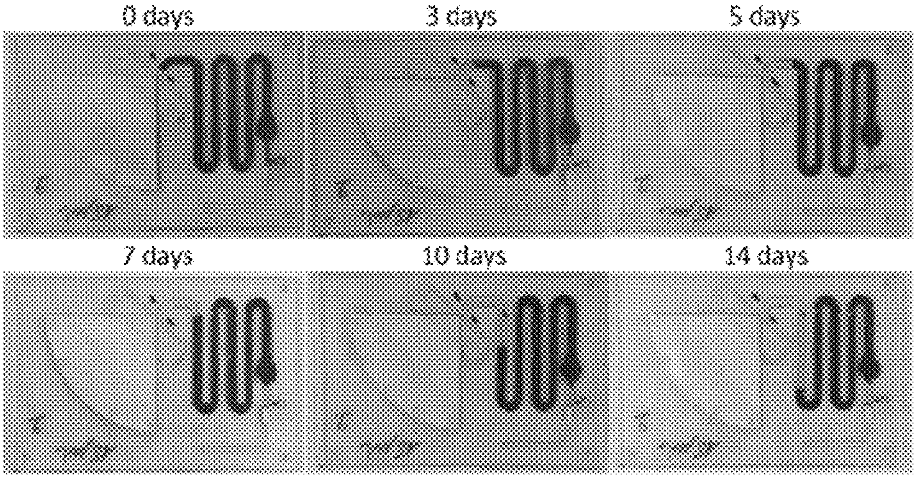
Fig. 8b
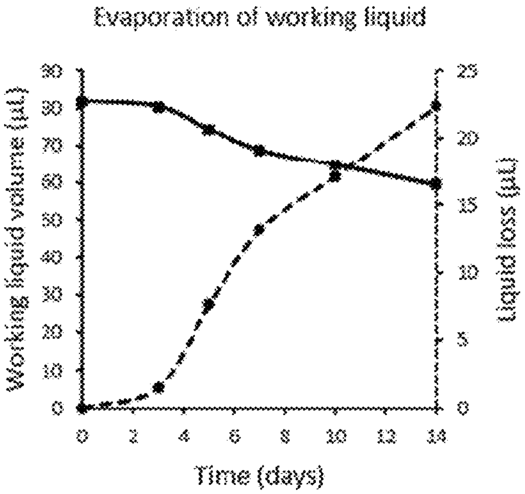
Figure 8

Fig. 11a
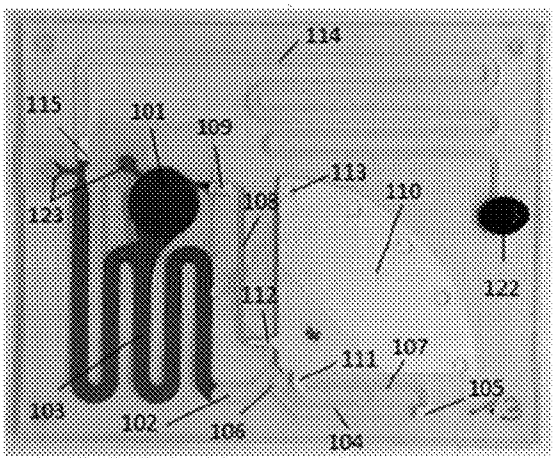
Fig. 11b
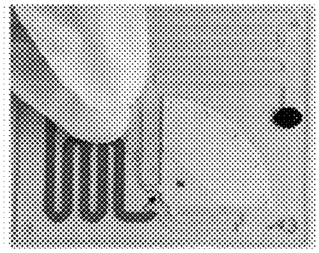
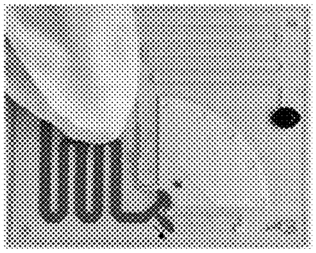
Fig. 11c
Fig. 11d
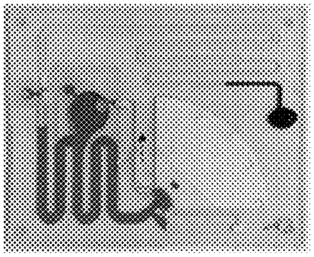
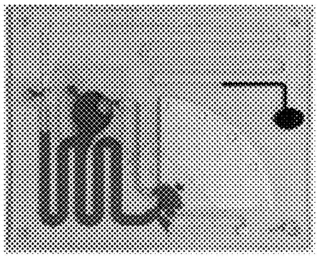
Fig.11e
Fig. 11f
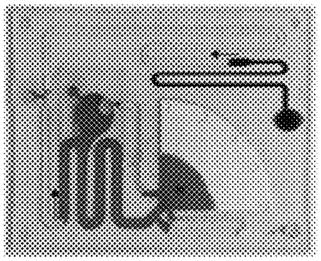
Figure 11

Fig. 13a
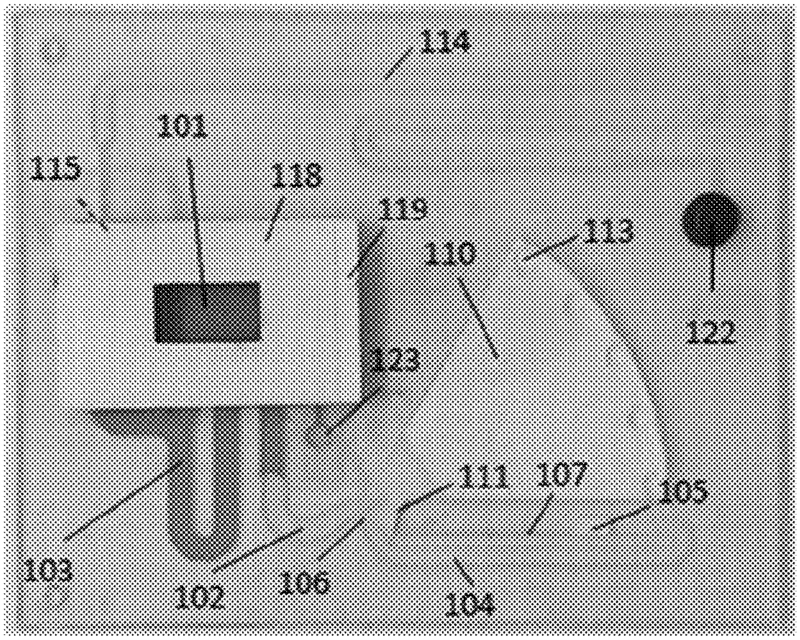
Fig. 13b
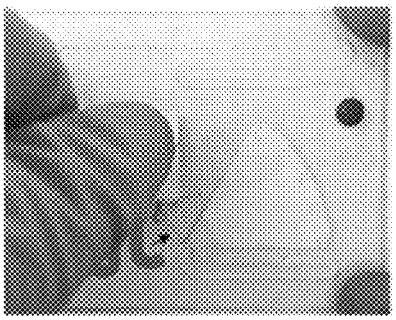
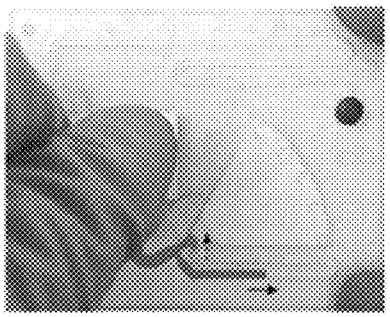
Fig. 13c
Fig. 13d
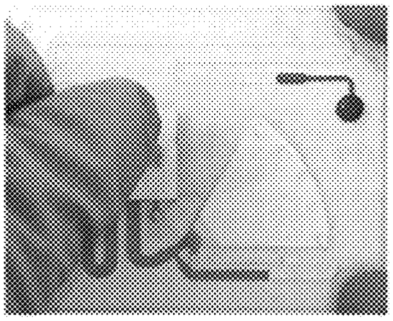
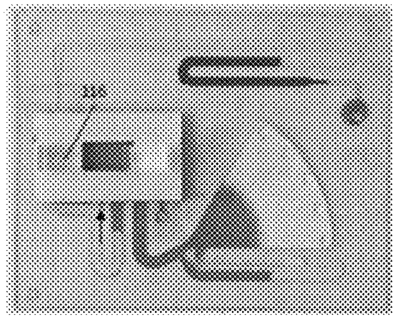
Fig. 13e
Figure 13

ACTIVATION AND PRESSURE BALANCING MECHANISM

FIELD OF THE INVENTION

In general, the disclosure relates to a fluid conduit device, such as microfluidic technique, with minimal operation. More specifically, the present invention relates to an activation and pressure balancing mechanism suitable for robust activation of fluid conduit devices.

BACKGROUND

In infusion or propulsion pump systems such as the (i)SIMPLE pumping technology (1-4) a pre-stored working liquid (in working liquid channel, blister pouch, . . . ) needs to be brought in contact with the porous substrate (e.g. filter paper) of the pumping system upon activation. This is called actuation and is traditionally done via finger-press which exerted force is user-dependent. Too high actuation pressure can lead to the occurrence of backflow from the working liquid to the connected upstream fluidic channel (dedicated to sample/reagents) or variability of the liquid wicking speed in the porous material and thus generated flow rate. Additionally, when the pressure source (e.g. fingertip) is removed after activation, the activation chamber retains again its original shape, leading to an abrupt introduction of a large negative pressure in the activation chamber. This negative pressure can lead to the disconnection of the working liquid from the porous pump material, stopping the pumping action, or disrupt the pressure balance in the connected fluid conduit or microfluidic network, introducing unwanted liquid manipulations. As in the current (i)SIMPLE technology, working liquids are pre-stored within the chip, issues with evaporation are observed during storage. Over time, the amount of working liquid reduces, leading to a retracting working liquid front in the working liquid channel. As a consequence, the air gap between the working liquid and tip of the porous pump tip becomes larger, making stable activation more difficult.

Traditionally the SIMPLE pump technology is activated via a single fingertip press at the activation part of the working liquid channel. As the force exerted on the activation part varies between people, actuation issues can arise leading to high pumping variations or even pump failures. An additional problem observed with the SIMPLE technology is that the working liquid evaporates over time during chip storage. During evaporation the working liquid front retracts over time and as a consequence the to be displaced volume for chip activation becomes larger over time. This leads to the introduction of very large pressure differences within the system that should be avoided.

In other microfluidic systems, different principles have been integrated to overcome these problems. For example, in the finger actuated microfluidic technology of Park J. and Park J. (Lab Chip, 2011) fluid propulsion is also actuated via fingertip pressing on an actuation chamber. In their concept, the actuation chamber is flanked by 2 check valves that ensure unidirectional flow upon actuation without occurrence of back flow and pressure imbalances. The same valving technology was patented (U.S. Pat. No. 7,942,160 B2) by Jeon L. et al. Although, these valving mechanisms using flexible films are very robust, they require complex manufacturing methods and 3D stacking.

SUMMARY OF THE INVENTION

The present invention concerns a methodology that makes the activation of the fluidic SIMPLE/iSIMPLE pumping technology more robust for varying user-dependent actuation forces. In particular, the concerned invention prevents the occurrence of pressure imbalances (i.e. backflow of the working liquid) within the fluid conduit system such as a microfluidic or nanofluidic system during activation of the pumping system. An additional feature of the invention is that it also enables the working liquid [103] to be prefilled/stored further away (larger air gap) from the porous substrate of the pump element [110] as illustrated in FIG. 1*a-b*. This is very interesting to overcome potential evaporation phenomena and problems with spontaneous activation (spontaneous movement of the working liquid to the porous pump) during storage and shipment. Depending on the actuation source two different configurations of the invention can be classified: (1) a setup in which the fluid displacement for pump activation is created by a temporary pressure source that is removed after actuation and (2) a permanent pressure source.

The present invention relates to a fluid conduit device comprising

- a capillary pump [110], comprising a solid sorbent enclosed in an enclosure and having an inlet and an outlet;
- a fluid conduit filled with a working fluid [103] and comprising an actuator zone [101] and a liquid channel
- the conduit being operationally connected to the inlet of the capillary pump and separated from upstream fluidic elements by a liquiphobic barrier [115] which is permeable to air but retains liquids;
- characterized in the presence of a channel [104] at one end [106] operationally connected to the fluid conduit, preferably to the liquid channel [102], at the proximity of the inlet of the capillary pump, and at the other end operationally connected to the capillary pump via a liquiphilic porous blocking vent [111].

In one embodiment, the working fluid [103] is a liquid. In one embodiment, the working fluid [103] is a working liquid.

In one embodiment, the channel [104] is at one end [106] operationally connected to the fluid conduit to prevent the build-up of pressure within the working liquid channel [102] during actuation of the actuator zone [101] as the excess of working liquid [103] displacement is directed in the channel [104], and at the other end, operationally connected to the capillary pump via a liquiphilic porous blocking vent [111]. In one embodiment, the channel [104] is at one end [106] operationally connected to the fluid conduit at the proximity of the inlet of the capillary pump, to prevent the build-up of pressure within the working liquid channel [102] during actuation of the actuator zone [101] as the excess of working liquid [103] displacement is directed in the channel [104], and at the other end operationally connected to the capillary pump via a liquiphilic porous blocking vent [111].

In one embodiment, the fluid conduit device comprises at least one filling hole [123]. In one embodiment, the fluid conduit device comprises at least two filling holes [123]. Said filling hole may be used for filling the fluid conduit comprising an actuator zone [101] and a liquid channel [102] with working liquid [103] and sealed afterward before using the device.

In one embodiment, the working fluid [103] is an aqueous liquid and the barrier [115] is a hydrophobic barrier which is permeable to air but retains aqueous liquids.

In one embodiment, the working fluid [103] is an oily liquid and the barrier [115] is a oleophobic barrier which is permeable to air but retains oily liquids.

In one embodiment, the fluid conduit device of the invention further comprises a channel [108], at one end operationally connected to the capillary pump via a liquiphilic porous blocking vent [112] and at the other end operationally connected to the actuator zone via a liquiphobic barrier [109] wherein the distance of the porous blocking vent [111] and [112] from the inlet of the capillary pump are chosen such that the liquid, preferably the working liquid, reaches porous blocking vent [111] prior to reaching porous blocking vent [112].

In one embodiment, the porous blocking vent [111] is located close to the inlet of the capillary pump. In one embodiment, the porous blocking vent [111] is located to be sealed rapidly after the beginning of the absorption of the working liquid by the solid sorbent in the capillary pump (i.e. close to the inlet of the capillary pump). In one embodiment, the porous blocking vent [111] is located ensure rapid saturation of the blocking vent [111] with the working liquid [103] so no air can pass through it. It is within the reach of the skilled artisan to adjust the distance between the inlet of the capillary pump [110] and the porous blocking vent [111] accounting, for example and without limitation, for the dimension of the capillary pump and volume of working liquid used.

In one embodiment, the porous blocking vent [112] is located close to the inlet of the capillary pump [110]. In one embodiment, the porous blocking vent [112] is located to be sealed rapidly after the beginning of the absorption of the working liquid by the solid sorbent in the capillary pump (i.e. close to the inlet of the capillary pump), preferably to be sealed rapidly after the beginning of the absorption of the working liquid by the solid sorbent in the capillary pump (i.e. close to the inlet of the capillary pump) and after the sealing of the porous blocking vent [111]. In one embodiment, the porous blocking vent [112] is located to ensure rapid saturation of the blocking vent [112] with the working liquid [103] so no air can pass through it, preferably to ensure rapid saturation of the blocking vent [112] so no air can pass through it after the saturation of the porous blocking vent [111]. It is within the reach of the skilled artisan to adjust the distance between the inlet of the capillary pump [110] and the porous blocking vent [112] accounting, for example and without limitation, for the dimension of the pump and volume of working liquid used.

In one embodiment, the fluid conduit device of the invention is a microfluidic device wherein the porous blocking vent [111] of the pressure release channel [104] is located less than 2 mm from the inlet of the capillary pump and the porous blocking vent [112] of the pressure compensation channel [108] is located between 2 and 4 mm from the inlet of the capillary pump.

In one embodiment, the fluid conduit device of the invention further comprises a permanent pressure source [116 or 117] suitable for actuation.

In one embodiment, the fluid conduit device of the invention is further connected to a fluid conduit [114].

The fluid conduit [114] is connected to further upstream fluidic elements wherein fluids, preferably liquid(s), such as reagent(s), buffer(s) or sample(s), may be manipulated using the fluid conduit device of the invention.

In one embodiment, the upstream fluidic elements comprise a second fluid, preferably a liquid. In one embodiment, said second liquid is buffer, reagent or sample.

In one embodiment, the fluid conduit device of the invention is connected to upstream fluidic elements via a fluid conduit [114]. In one embodiment, the opening of the fluid conduit [114] is located in the actuator zone [101] or in the fluid channel [102]. In one embodiment, the opening of the fluid conduit [114] is located in the actuator zone [101].

In one embodiment, the fluid conduit device of the invention comprises a fluid conduit filled with a working liquid [103] and comprising an actuator zone [101] and a liquid channel [102], the conduit being (i) operationally connected to the inlet of the capillary pump, (ii) connected to upstream fluidic elements via a fluid conduit [114], and, (iii) separated from said upstream fluidic elements by a liquiphobic barrier [115] which is permeable to air but retains liquids.

In one embodiment, the fluid conduit device of the invention comprises a fluid conduit filled with a working liquid [103] and comprising an actuator zone [101] and a liquid channel [102], the conduit being (i) operationally connected to the inlet of the capillary pump, (ii) connected to upstream fluidic elements via a fluid conduit [114], wherein said fluidic elements comprise a second liquid, and, (iii) separated from said upstream fluidic elements by a liquiphobic barrier [115] which is permeable to air but retains liquids.

The present invention also relates to a method for robust activation of a fluid conduit using the fluid conduit device of the invention, the method comprising providing a pressure on the actuator zone [101], thereby allowing robust activation of the capillary pump [110] by diverting excess working fluid [103] temporarily into a pressure release channel [104] until the liquiphilic porous blocking vent [111] is saturated.

BRIEF DESCRIPTION OF THE DRAWINGS

FIG. 1, including FIGS. 1*a* and 1*b*, FIG. 1*a*. shows the schematics of the fluid conduit or microfluidic system including the capillary pump and the activation and pressure balancing mechanism. Black area indicates liquids, dashed area indicate liquiphilic porous materials, white rectangles indicate liquiphobic porous materials [105, 109, 115]. FIG. 1*b* shows an identical system wherein the distance between the front of the working liquid [103] and the inlet of the pump element [110] is longer.

FIG. 2, including FIGS. 2*a* to 2*g*, shows the different steps in the working principle of the microfluidic system once the pumping system (SIMPLE) is activated and the effect of integrated activation and pressure balancing mechanism. Solid arrows indicated liquid movement direction, dotted arrows indicate gas movement direction, solid arrows with white tip indicate external pressure application/removal.

FIG. 3, including FIGS. 3*a* to 3*e* shows side views of the fluid conduit or microfluidic system with focus on the activation zone. It shows the different steps of fluid (air (dotted arrow) and water (solid arrow)) behavior within the activation chamber [101] during pump activation with a temporary actuation source.

FIG. 4, including FIGS. 4*a* and 4*b*, shows two different configurations of the activation mechanism with fixed volume displacement. In both cases only the pressure release channel is integrated, connecting the capillary pump and the front of the working liquid channel. In the first configuration (shown in FIG. 4*a*—panel on the left in FIG. 4 of the priority application GB2014687.4, filed Sep. 17, 2020), the volume displacement is introduced via an external stimulus, which once that is attached to the top of the chip (e.g. via double side tape, glue) generates a precise and controlled displacement. In the second configuration (shown in FIG. 4*b*—Panel on the right in panel on the left in FIG. 4 of the priority application GB2014687.4, filed Sep. 17, 2020), all the working liquid is stored within an external liquid container [117] (i.e. aluminum blister pouch) which is completely sealed from the microfluidic network. The reference [116] on the right panel of FIG. 4 of the priority application GB2014687.4, filed Sep. 17, 2020 corresponds to the reference number [117] in FIG. 4*b* of the present document.

FIGS. 5*a* to 5*f*, shows the working principle of the pump activation system in which a permanent pressure source [116 or 117] is used for actuation. Here only the pressure release channel is present. The correspondence between the reference number in FIG. 5 of the priority application GB2014687.4, filed September 17 and FIG. 5 in the present document is as follows: [601] in the priority application GB2014687.4 corresponds to [101] in the present document; [602] in the priority application GB2014687.4 corresponds to [102] in the present document; [603] in the priority application GB2014687.4 corresponds to [103] in the present document; [604] in the priority application GB2014687.4 corresponds to [104] in the present document; [605] in the priority application GB2014687.4 corresponds to [105] in the present document; [606] in the priority application GB2014687.4 corresponds to [106] in the present document; [607] in the priority application GB2014687.4 corresponds to [110] in the present document; [608] in the priority application GB2014687.4 corresponds to [111] in the present document; [609] in the priority application GB2014687.4 corresponds to [113] in the present document; [610] in the priority application GB2014687.4 corresponds to [114] in the present document; [611] in the priority application GB2014687.4 corresponds to [115] in the present document.

FIGS. 6*a* to 6*d*, shows side views of the microfluidic system with focus on the activation zone in case a permanent pressure is applied, and the working liquid is prefilled in its chamber. It shows an example where a separate plastic, wooden, (or any other type of material) piece foreseen with a protrusion can be stuck on the activation chamber via double-sided tape (or any other attachment mechanism) [118] to provide a fixed and precise displacement of working liquid.

FIGS. 7*a* to 7*d*, shows side views of the microfluidic system with focus on the activation zone in case a permanent pressure is applied, and the working liquid is stored in liquid storage container (e.g. blister pouch) integrated on top of the microfluidic device. Once the container is burst (e.g. applying sufficient pressure or contacting the container with a piercing element integrated in the channel underneath) it keeps its deformed shaped providing a constant pressure. At the same time, the working liquid is released in its channel.

FIG. 8, including FIGS. 8*a* and 8*b*, illustrates the evaporation of the working liquid over time. FIG. 8*a* is a set of photographs of the same chip left for several days at room temperature after preloading and sealing. The dashed lines on the photographs represents the working liquid level at 0 day. FIG. 8*b* is a graph showing the change of working liquid volume within the chip (solid line, square markers) and the amount that has evaporated (dashed line, circular markers).

FIG. 9*a*: photograph of the system before actuation. FIG. 9*b*; Bursting of the hydrophobic stop valve [115] at the receding end of the working liquid channel as a result of the generated backflow (indicated by the solid arrow) during finger-press actuation. FIG. 9*c*: Improper sample [122] intake in the microfluidic system due to the formation of air bubbles as a consequence of the pushed back air (indicated by the dashed arrow in B) during activation.

FIG. 11, including FIGS. 11*a* to 11*f*, illustrates the activation of a microfluidic system of design according to FIG. 10. FIG. 11*a*: photograph of the system before actuation, FIGS. 11*b* to 11*f*: set of photographs of the successive steps of the activation of the system following actuation with a temporary pressure source (fingertip press activation in this example). Arrows illustrate the liquid (solid arrows) and air (dotted arrows) displacement. FIG. 11*b*: finger-press activation; FIG. 11*c*: entry of working fluid in the pressure release channel due to excessive pressure; FIG. 11*d*: release of finger-press and pressure balancing; FIG. 11*e*: sealing of the pressure compensation channel and F: robust intake of the sample liquid.

FIG. 13, including FIGS. 13*a* to 13*e*, illustrates the activation of a microfluidic system of design according to FIG. 12 using a permanent pressure source functioning similarly to that of FIG. 6. FIG. 13*a*: photograph of the system before actuation, without the activation piece [116]. The liquiphobic barrier [115] is hidden by the spacing element [119]. FIGS. 13*b* to 13*e*: photograph of the successive steps of the activation of the system following actuation with a permanent pressure source [116]. Arrows illustrate the liquid (solid arrows) and air (dotted arrows) displacement. FIG. 13*b*: actuation with the permanent pressure source [116] (hidden by the finger in 13*b* to 13*d*); FIG. 13*c*: entry of working fluid in the pressure release channel due to excessive pressure; FIG. 13*d*: release of finger-press; FIG. 13*e*: robust intake of the sample liquid [122], the permanent pressure source [116] is visible and attached in an actuated position to the double-sided tape [118].

DETAILED DESCRIPTION OF VARIOUS EMBODIMENTS

Figure 5:
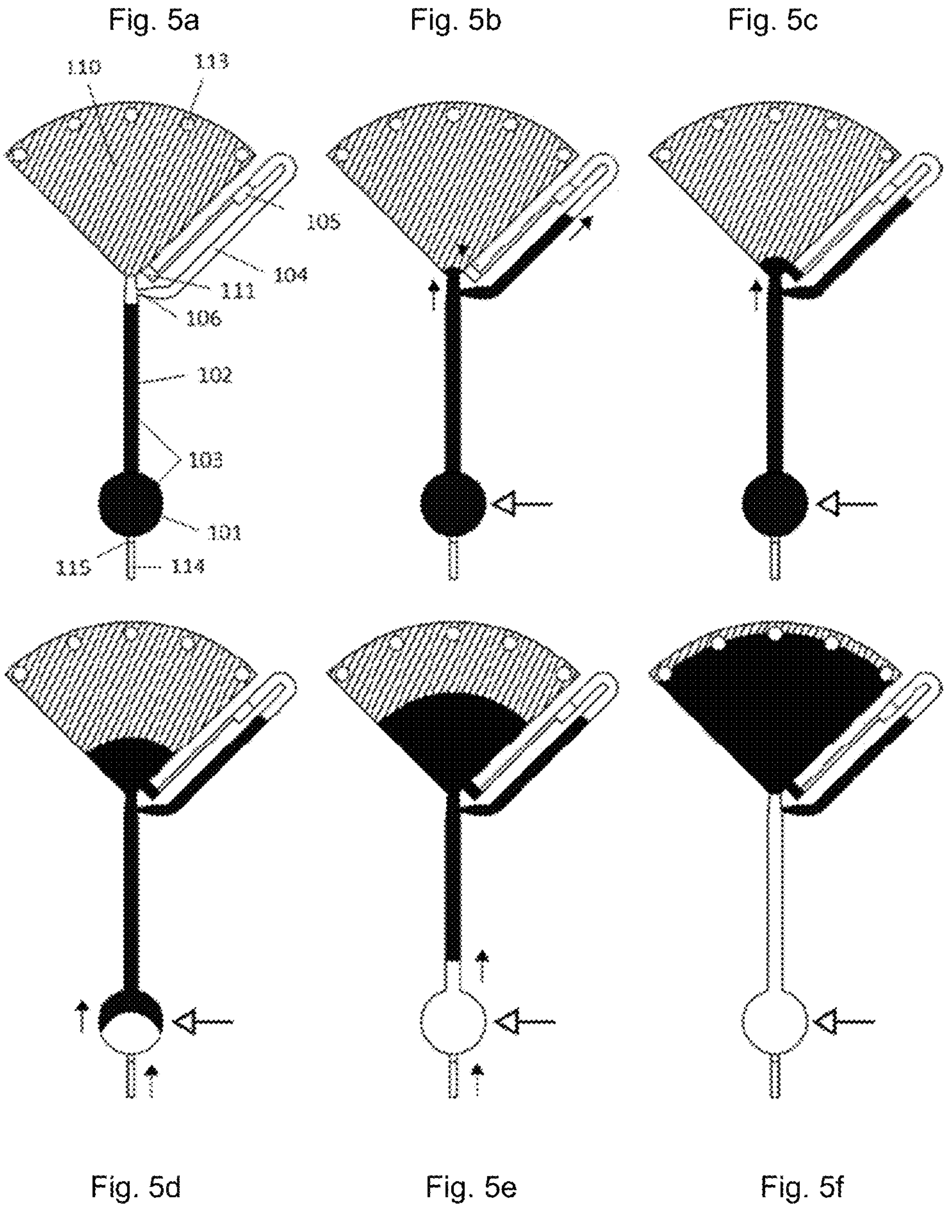
FIG. 5, including

One aspect of the invention is the activation chamber/element [101/117] is a liquid storage container [101 or 117] that is in direct (or indirect) connection with the working liquid channel [102] and contains an excess amount (1-1000 μL) of working liquid [103]. By exerting pressure (via a temporary or permanent pressure source) on this chamber, the working liquid [103] within the chamber and connecting working liquid channel is displaced towards the porous material of the pump element [110] leading to pump activation. Different types of activation elements can exist:

- in one embodiment the activation chamber can be part of or in connection with the working liquid channel [102]. In this embodiment the working liquid [103] can be prefilled in both the activation chamber and working liquid channel and can also be in direct connection with the rest of the microfluidic network.

in another embodiment all the working liquid can be contained within the a separate liquid storage container [117] (e.g. blister pouch, for instance and without limitation, an aluminum blister pouch). In this setup, the working liquid can be completely disconnected from the rest of the microfluidic network (e.g. via thin film [120]). Upon activation of this container, the container and microfluidic network become connected (e.g. piercing of thin film or membrane [120]) and all the contained liquid is displaced within the working liquid channel [102] towards the porous pump element [110].

The ability to store an excess of working liquid makes the system independent of evaporation effects which can lead to a reduced working liquid volume in the working liquid channel. (e.g. retracting front of working liquid in working liquid channel).

Another aspect of the invention is the working liquid channel [102], a microfluidic channel that forms the connection between the activation chamber/element [101] and the porous pump element [110]. The dimensions (100-5000 μm) of the channel determine the volume (1-1000 μL) of working liquid [103] that can be absorbed by the porous material of the pump element [110].

The present invention further comprises a pressure release channel [104], a microfluidic channel that connects the distal or downstream part of the working liquid channel [102] with the porous material of the pump element [110]. This channel prevents the build-up of pressure within the working liquid channel [102] during actuation of the activation chamber [101] as the excess of working liquid [103] displacement is directed in this channel. Upon entering of the working liquid in the channel, the present air is expelled to the air vents [113] of the porous pump element [110] via a liquiphilic porous blocking vent [111]. This vent is located very close (<2 mm in microfluidic systems) to the tip, or inlet, of the pump element [110] to ensure immediate blocking of the pressure release channel [104] after activation.

In microfluidic systems, suitable pore sizes of the solid sorbent of the blocking vent has cavities with pore diameter of a value between 0.1 to 35 μm.

Advantages of the pressure release channel are:

Makes the system robust to variable or too high activation forces (user-variability) during system actuation.

Prevents the build-up of pressure in the working liquid channel leading to backflow of the working liquid to the connected microfluidic network [114].

Leads to a more reproducible initial wetting of the porous material of the pump element and thus less variations in generated flow rate of the pump. (not validated yet)

The dimensions (volume) of the pressure release channel can simply be tuned to the maximal expected volume displacement (1-100 μL) upon activation.

Makes the system robust to volume reduction of the working liquid due to evaporation phenomena during storage. This allows the use of a larger excess of working volume in the activation chamber without risking backflow.

Allows the prefilling of the working liquid to be further away from the tip of the pump element, reducing the chance of spontaneous activation during shipment and storage.

In another aspect of the invention a porous blocking vent comprising a hydrophilic porous material (absorbs aqueous fluids upon contact) that is in direct contact with the porous pump element [110], forms a connection with another section(s) of the microfluidic network via a microfluidic channel [104]. The blocking vent exists in two phases: a dry phase in which it is permeable for air and a wet phase in which the vent is saturated with liquid and no air is allowed to pass. The availability of both an open and closed state of the blocking vent allows different sections of a microfluidic network to be in connection with each other for a certain period after which the connection is blocked. The vent can be positioned in direct connection with the porous material of the pump element and the timing of blocking can be tuned by the distance between the tip and connection with the blocking vent. In this setup the working liquid of the pump element acts as blocking liquid of the vent. The vent can also be integrated within the channels of a microfluidic network to block the connection between microfluidic circuits. In this setup part of the to be manipulated liquid (e.g. sample, reagent, . . . ) needs to be used to saturate the vent. A separate blocking liquid can also be foreseen specifically intended for vent blocking.

In another embodiment the present invention comprises a pressure compensation/balancing channel [108], which is a microfluidic channel that connects the activation chamber/element [101] with the porous material of the pump element [110]. For example, in microfluidic devices, the channel width of the compensation/balancing channel [108] can be designed to be 0.6-0.7 mm. This, however, can be as narrow as preferred as it is just an air connection. Also, a wider channel would be possible but this has no technical advantage. The connection of this channel (via a porous blocking vent [112] is located further away (2-4 mm in microfluidic systems) from the tip of the pump element [110] (compared to the one [111] in the pressure release channel). As a result, the porous blocking vent [112] is not wetted yet after activation still allowing the inflow of air towards the activation chamber/element [101], compensating for the pressure imbalance introduced after the removal of the pressure source exerted on the activation chamber/element [101].

This feature is only required in the embodiment where a temporary pressure source is used for actuation of the system. Indeed, the pressure compensation channel allows the inflow of air after removing the actuation source from the activation chamber.

In another aspect, the present invention provides that the device is a microfluidic device.

In another aspect, the present invention provides that the device is a nanofluidic device.

J. Park and J. Park (*Lab Chip* (2018), 18, 1215-1222) describe an actuation chamber really acts as the pump to manipulate the liquid from the downstream to the upstream micro channel. In our invention the actuation chamber is used to bring the working liquid in contact with porous material and initiate the pump. This pump will then act autonomously to manipulate liquids within the connected microfluidic network. The actuation chamber of Park and Park requires periodically pressing (multiple times) to manipulate the liquid through the microfluidic system, whereas the present invention only requires a single activation step.

The actuation chamber of Park and Park is flanked by 2 check valves in the connected microfluidic channels. These check valves only allow fluid flow in 1 direction when they are in the 'open' state. Due to their respective position to the actuation chamber, both check valves are always in a different state (open or closed). As a consequence, only either the up or downstream microfluidic network is manipulated upon finger-press or finger-release. The open and closed states of the check valves are reversible, and thus can be use multiple times.

Compared to the state of the art the actuation chamber of U.S. Pat. No. 7,942,160 B2 also shows some differences Both valves lead to the same technical result, which is fluid flow in only a certain direction.

The open and closed state of our blocking vent is only single use (irreversible), while the valve in this patent can change its states multiple times.

The blocking vent makes use of the wicking properties of a porous material to seal off air flow between 2 channels from while in the embodiment of this patent a flexible thin film is used to seal of the connection between 2 channels.

The valve with flexible thin film requires much more complicated fabrication methodologies such as 3D microfabrication, perfect alignment and bonding of multiple layers. The blocking vent presented in this invention can be fabricated in a single microfluidic layer.

The blocking vent does not allow the passage of liquids (only gases) in neither up or downstream direction in open state.

Numbered embodiments of the present inventions are:

1. A fluid conduit device comprising
   a capillary pump [110], comprising a solid sorbent enclosed in an enclosure and having an inlet and an outlet;
   a fluid conduit filled with a working fluid [103] and comprising an actuator zone [101] and a liquid channel [102], the conduit being operationally connected to the inlet of the capillary pump and separated from upstream fluidic elements by a liquiphilic filter paper or filter paper treated with liquiphilic coating such as, without limitation, P100 or X100 coating (Joninn aps).

In one embodiment, the pressure release channel [104], further comprises between the connection to the working fluid conduit [106] and the liquiphilic porous blocking vent [111] a liquiphobic barrier [105]. In this embodiment, the portion [107] of the pressure release channel between the liquiphobic barrier [105] and the liquiphilic porous blocking vent [111] may be as narrow as preferred as it is just an air connection.

In one embodiment, the working fluid is aqueous, said liquiphobic barrier is an hydrophobic barrier. In one embodiment, the working fluid is oily, said barrier is an oleophobic barrier.

2. A fluid conduit device according to embodiment 1 wherein the working fluid [103] is an aqueous liquid and the barrier [115] is a hydrophobic barrier which is permeable to air but retains aqueous liquids.
3. A fluid conduit device according to embodiment 1 wherein the working fluid [103] is an oily liquid and the barrier [115] is a oleophobic barrier which is permeable to air but retains oily liquids.
4. The device according to embodiment 1, further comprising a channel [108], at one end operationally connected to the capillary pump via a liquiphilic porous blocking vent [112] and at the other end operationally connected to the actuator zone via a liquiphilic barrier [109] wherein the distance of the porous blocking vent [111] and [112] from the inlet of the capillary pump are chosen such that the liquid reaches porous blocking vent [111] prior to reaching porous blocking vent [112].

In a preferred alternative embodiment 4, The device according to embodiment 1, further comprises a channel [108], at one end operationally connected to the capillary pump via a liquiphilic porous blocking vent [112] and at the other end operationally connected to the actuator zone via a liquiphobic barrier [109] wherein the distance of the porous blocking vent [111] and [112] from the inlet of the capillary pump are chosen such that the liquid reaches porous blocking vent [111] prior to reaching porous blocking vent [112].

In one embodiment, the capillary pump [110] comprises at least one vent hole [113].

In one embodiment, the porous blocking vent [111] is liquiphilic. In one embodiment, the working fluid is aqueous and the porous blocking vent [111] is hydrophilic. In one embodiment, the working fluid is oily and the porous blocking vent [111] is oleophilic. In one embodiment, the porous blocking vent [112] is liquiphilic. In one embodiment, the working fluid is aqueous and the porous blocking vent [112] is hydrophilic. In one embodiment, the working fluid is oily and the porous blocking vent [112] is oleophilic. In one embodiment, the porous blocking vent comprises liquiphilic porous material so that when saturated with liquid, the saturated porous material block seal the vent (prevent the circulation of gases thought the vent).

4. The device according to embodiment 4, wherein
   The device is a microfluidic device.
   The porous blocking vent [111] of the pressure release channel [104] is located less than 2 mm from the inlet of the capillary pump.
   The porous blocking vent [112] of the pressure compensation channel [108] is located between 2 and 4 mm from the inlet of the capillary pump.

In one embodiment, the device is a microfluidic device, the porous blocking vent [111] of the pressure release channel [104] is located less than 2 mm from the inlet of the capillary pump and the porous blocking vent [112] of the pressure compensation channel [108] is located between 2 and 4 mm from the inlet of the capillary pump.

6. The device according to embodiment 4 and 5, preferably to embodiment 4 or 5, wherein the working fluid [103] is an aqueous liquid and the barrier [109] is a hydrophobic barrier, which is permeable to air but retains aqueous liquids.
7. The device according to embodiment 4 and 5, preferably to embodiment 4 or 5, wherein the working fluid [103] is an oily liquid and the barrier [109] is an oleophobic barrier, which is permeable to air but retains oily liquids.
8. The device according to any of the embodiments 1 to 3, further comprising a permanent pressure source [116 or 117] suitable for actuation.
9. The device according to embodiment 8, wherein a liquid storage container [117] functions as the permanent pressure source.

In one embodiment, the liquid storage container is made of material that retain its shape after actuation. This embodiment may for instance be advantageous to avoid generating a backward flow of working liquid toward the actuator zone.

10. The device according to any of the embodiments 1 to 9 further connected to a fluid conduit [114].
11. A method for robust activation of a fluid conduit using the device according to any of the embodiments 1 to 10, the method comprising providing a pressure on the actuator zone [101], thereby allowing robust activation of the capillary pump [110] by diverting excess working fluid [103] temporarily into a pressure release channel [104] until the liquiphilic porous blocking vent [111] is saturated 12. The method according to embodiment 11 wherein a pressure compensation channel [108] allows compensating for the pressure imbalance introduced after the removal of the pressure source exerted on the activation chamber/element [101] by allowing inflow of air after removing the actuation source from the activation chamber.

EXAMPLES

Example 1: Setup 1: Pump Activation by Fluid Displacement with Temporary Pressure Source (Finger-Press Actuation)

Description of Working Principle

An important feature for a robust field-proof fluid conduit system is the activation. Therefore, a pressure release system has been developed, depicted in FIG. 2. The system consists of a bifurcation to a side channel that connects to the porous material (e.g. Whatman grade 598, Cytiva). When the working liquid (i.e. distilled water with food colorant dye in 1:20 ratio in the case of aqueous solutions or oils) is pushed into the pump, the porous material exerts a resistance forcing the rest of the working liquid into the side channel and releasing the excess pressure applied Immediately after activation, the connection to the pressure release channel is sealed by the working liquid, avoiding air to flow back into the working liquid channel. When operating with aqueous solutions, the stop valves are hydrophobic stop valves (Whatman grade 598 (Cytiva) treated with hydrophobic solution such as Aquapel or Fluoropel (cytonix)) inside the pressure release channel (shown in red or [105]) is integrated to avoid the working liquid traveling completely through the side channel into the porous material as that would lead to activation failure. When operating with an oily working liquid the stop valves are oleophobic (Whatman grade 598 (Cytiva) treated with oleophobic solution such as Fluoropel (cytonix).

When releasing the finger after activating the pump, suction should smoothly start by the paper wicking in the working liquid. However, the release of the deflection of the plastic acts similarly to a piston-pump, creating an unwanted negative pressure. Thus, the blood sample is drawn in too suddenly, causing possible failures of the upstream microfluidic network such as in burst valves in the metering system. To solve this, an extra pressure stabilization connection between the activation bubble and the porous material was added (FIG. 2). This connection allows the deflection of the plastic after activation by drawing air from outside the system instead of causing a peak in the suction force. Also here, the side channel seals off as soon as the working liquid is being wicked into the connecting porous material.

More in detail, FIGS. 2*a-g* illustrate the different steps in the working principle of the pumping system (SIMPLE) with integrated activation and pressure balancing mechanism. In this configuration, the pump is initiated by means of temporary actuation (i.e. fingertip press).

(a) Overview of the SIMPLE pumping system with activation and pressure stabilizing mechanism showing its different embodiments. An activation chamber/element [101] that is connected to the porous pumping element [110] (e.g. Whatman grade 598, Cytiva) via a working liquid channel [102]. Both activation chamber/element [101] and working liquid channel [102] are prefilled with a working liquid [103] (e.g distilled water or oil). The working liquid channel can be prefilled until just before the T-junction [106] of the pressure release channel [104] or at a further distance away from it (see FIG. 1*a-b*). This depends on the working liquid volume present within the activation chamber (and thus the total volume that can be displaced upon activation). A pressure compensation channel [108] forms a connection between the porous pumping element [110] and the activation chamber/element [101]. The pumping unit is connected via the activation chamber [101] to an upstream microfluidic network [114] via a hydrophobic barrier [115]. This valve only allows the passage of gases whilst retaining liquids, making the system connected in terms of air flow and pressure gradients, but ensuring fluid flow is separated between the microfluidic circuit and pumping mechanism.

(b) The pumping unit is actuated by deflecting the activation chamber [101] (by using for example a finger-tip press represented in FIG. 2*b* by an empty arrow) and thus displacing the working liquid [103] within the activation chamber/element [101] and working liquid channel [102] towards the porous substrate of the pump element [110] (direction of fluid displacement is represented by full arrows with solid lines). The excess of displaced working liquid [103] is forced into the pressure release channel [104] preventing too high-pressure build-up within the system. Together with the hydrophobic barrier [115] (permeable for gases but not for liquids) directly positioned next to the activation chamber, this mechanism avoids backflow of the working liquid [103] towards the connected microfluidic network [114]. The air within the pressure release channel [104] is expelled (air flow is indicated dashed arrows) via a porous blocking vent [111] that is in connection with the porous substrate of the pumping element [110], and via its venting holes [113] to the environment. An upstream hydrophobic barrier [105] is present to prevent the working liquid [103] being pushed towards the paper substrate [110] at a second location next to the pump tip. The size/volume of the pressure release channel [104] can be adjusted to the maximal expected displaced volume by the activation chamber/element [101].

(c) Upon actuation of the activation chamber [101], the working liquid [103] starts to wick in the porous substrate of the pump element [110]. The porous blocking vent [111], close to the tip of the porous pump element, immediately gets saturated with working liquid [103] and prevents the intake of air within the pressure release channel [104] from the venting holes [113]. As a consequence, only the working liquid [103] present within the working liquid channel [102] and activation chamber/element [101] can be taken up by the porous material of the pumping element [110]. When removing the pressure source (i.e. fingertip) on top of the activation chamber/element [101], it will deflect again to its normal size/volume (again represented by empty arrow). The abrupt negative pressure of the deflection must be prevented to avoid backflow which can lead to (1) breakage of the porous pump element [110] and the working liquid [103] or (2) pressure instability within the upstream connected microfluidic network [114]. Hereto, a pressure compensation channel [108] connects the activation chamber/element [101] with the porous pump element [110]

via a second porous blocking vent [112]. This vent is located further away from the tip of the porous pump element [110] compared to the porous blocking vent [111] and does not get immediately saturated with working liquid [103] upon actuation. As the air vent, before saturation, is still in connection with the environment (via the vent holes [113] of the pump unit), inflow of air is possible upon removing the actuation source on the activation chamber/element [101]. As a consequence, the pressure imbalance between the activation chamber [101] and the rest of the system (upstream working liquid and downstream microfluidic network) is being compensated for.

(d) After a certain period of time (depending on the distance of the second porous blocking vent [112] from the tip of the porous pump element [110]), the second porous blocking vent [112] gets saturated with working liquid [103] as well, blocking the connection to the environment. For microfluidic devices, the first blocking vent [111] saturates immediately after releasing the excess pressure, and thus within a second after activation. The second blocking vent [112] should be saturated about 1-2 seconds later.

(e-g) When no air can be pulled from the air vents of the pumping element, a negative pressure within the activation chamber (and working liquid channel) is created over time. This negative pressure can be used to manipulate fluids in the upstream microfluidic network.

In FIG. 3*a-e*, the different steps of fluid (air and water) behavior within the activation chamber [101] is shown during pump activation with a temporary actuation source.

(a) Activation chamber [101] with connected working liquid channel [102] that is prefilled with working liquid [103]. The working liquid is separated from the upstream microfluidic network [114] via a hydrophobic barrier [115], which is permeable to air but retains aqueous liquids.

(b) Actuation of the activation chamber [101] via an external pressure source deflecting the activation chamber [101] leading to the displacement of the working liquid [103] within the working liquid channel [102].

(c) When removing the external pressure source from the activation chamber [101], it retains again its original volume generating an abrupt negative pressure in the connected microfluidic system [114]. As the activation chamber [101] is still in contact with the environment via the pressure compensation channel ([108] FIG. 2), it pulls in air (via the second hydrophobic barrier [109]) to compensate for the negative pressure.

(d-e) From the moment the blocking vent [112 FIG. 2] blocks the inflow of air from the pressure compensation channel, the generated negative pressure (i.e. negative relative pressure) by the pumping element allows liquid manipulation in the upstream microfluidic network [114].

Example 2: Setup 2: Pump Activation by Fixed Volume Displacement (External Piece, Blister, . . . )

In the Figure below two different configurations of the activation mechanism with fixed volume displacement are illustrated. In the first configuration (shown in FIG. 4*a*), the volume displacement is introduced via an external stimulus such as the attachment of external activation piece, press button, deflecting membrane or any other pressure source [116] that leads to a permanent deflection of the activation chamber [101]. In this configuration all the working liquid [103] is prefilled and stored within the microfluidic network of pumping system.

In the second configuration (shown in FIG. 4*b*), all the working liquid is stored within an external liquid container [117] (i.e. aluminum blister pouch) which is completely sealed from the microfluidic network. By actuating the liquid container (by for example a fingertip press), part of the container will open (i.e. bursting of the bottom thin film in an aluminum blister pouch) and pushed/injected inside the working liquid channel [102]. Upon actuation all the stored working liquid [103] within the storage container [117] will be displaced into the working liquid channel [102] and activate the pumping system. More details regarding the working principle of both configurations are given in FIG. 6-7.

Description of Working Principle

In FIG. 5*a-f* the working principle of the pump activation system is illustrated in which a permanent pressure source [116 or 117] is used for actuation.

(a) Overview of the SIMPLE pumping system with activation and pressure stabilizing mechanism indicating its different embodiments. An activation unit [101] is connected to the porous pumping element [110] via a working liquid channel [102]. Depending on the configuration only the activation unit [117] (FIG. 4*b*) or both activation unit [101] and working liquid channel [102] (FIG. 4*a*) are prefilled with a working liquid [103]. In the latter configuration the working liquid channel can be prefilled until just before the T-junction [106] of the pressure release channel [104] or at a further distance away from it. This depends on the working liquid volume present within the activation chamber [101]. The pump is connected via a hydrophobic barrier [115] to an upstream microfluidic network [114].

(b) The pumping mechanism is initiated by actuating the activation chamber [101] or liquid storage container [117] by an external pressure source (FIGS. 4*a* and *b*, respectively), and this way displace the working liquid [102] towards the porous pump element [110]. The excess of displaced working liquid [103] is forced into the pressure release channel [104] protecting the system against the build-up of too high pressures. This avoids backflow of the working liquid [103] towards the connected microfluidic network [114]. The air within the pressure release channel [104] is expelled via a porous blocking vent [111] that is connected with the porous substrate of the pumping element [110]. An upstream hydrophobic porous barrier [105] is present to prevent the working liquid [103] being pushed towards the porous pump element [110] at a second location next to the pump tip. The size/volume of the pressure release channel [104] can be adjusted to the maximal expected displaced volume by the activation chamber/element [101].

(c) Upon actuation of the activation chamber [101] using the activation unit [116] or liquid storage container [117], working liquid [103] starts to wick in the porous pump element [110]. The porous blocking vent [111], which is very close to the tip of the porous pump element [110], immediately gets saturated with working liquid [103] and prevents the intake of air within the pressure release channel [104]. As a consequence, only working liquid [103] present within the working liquid channel [102] can be taken up by the porous pumping element [110]. In this embodiment, the volume displacement in the working liquid channel [102] is irreversible, circumventing the requirement of the pressure compensation channel ([108] in FIG. 2).

(d-f) All the working liquid [103] within the working liquid channel [102] gets absorbed by the porous pump element [110] generating a negative pressure within the upstream microfluidic network [114] enabling liquid manipulation.

Figure 6:
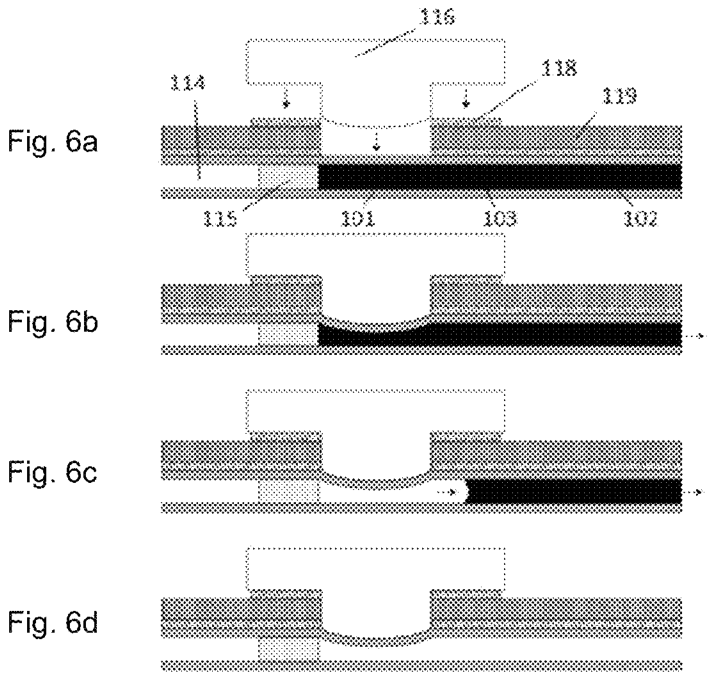
FIG. 6, including
Figure 7:
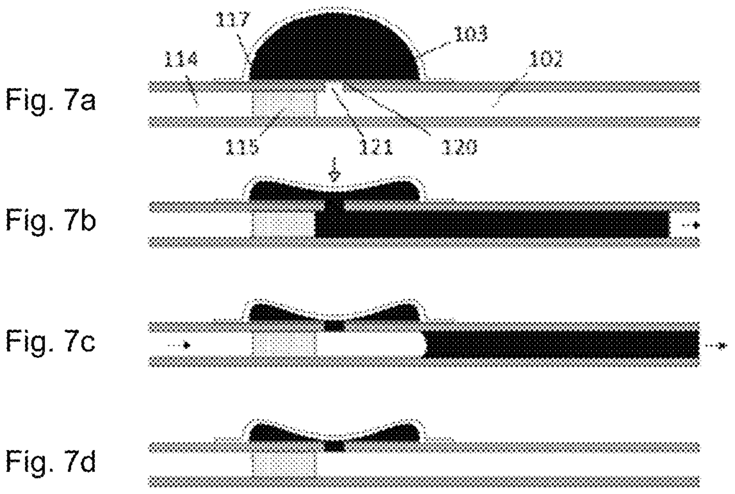
FIG. 7, shows

In FIGS. 6 and 7 more detailed information on the working principles of two different activation configurations are illustrated. FIG. 6 concerns the configuration in which an external activation element is used to introduce an irreversible deflection of the activation chamber [101] and this way displace the working liquid [103] within, towards the porous pump element [110]. A hydrophobic barrier [115] that forms the connection between the upstream microfluidic circuit [114] and the pump, directs the working liquid displacement in the direction of the porous pump element. In this configuration all the working liquid is stored within the microfluidic network of the chip.

To introduce the deflection, a variety of mechanisms (external activation piece, press button, deflecting membrane or any other pressure source [116] that leads to a permanent deflection of the activation chamber [101]) can be used. In a simple example (illustrated in FIG. 6), a separate plastic, wooden, (or any other type of material) piece foreseen with a protrusion can be stuck on the activation chamber via double-sided tape (or any other attachment mechanism) [118]. By precisely tuning the length of the protrusion, the volume displacement can be determined. As the activation element [116] will be fixed on the activation chamber [101], the liquid displacement becomes irreversible. Also more complex concepts can be used in which screw or button-like mechanisms are used that are completely integrated on top of the system.

In the second configuration (FIG. 7) a liquid storage container (e.g. blister pouch) is integrated on top of the microfluidic device. The container is completely sealed from the microfluidic network upon storage by a thin film. By compressing the storage container (i.e. with a fingertip press), the thin film [120] will burst (or rip by an integrated sharp needle at the bottom of the working activation chamber), allowing the liquid content (i.e. working liquid) to be injected within the working liquid channel via a small connection hole [121] in the top of the activation chamber. Again the hydrophobic barrier [115] will prevent the working liquid to flow towards the upstream microfluidic network [114], but direct it upstream the working liquid channel [102] towards the porous pump element [110]. It is crucial that the liquid storage container [117] retains its shape after compression. Otherwise, backflow might arise. A big advantage of the using a liquid storage container is that the working liquid is completely sealed from the environment, minimizing evaporation effects.

Example 3: Concept and Fabrication of (i)SIMPLE Technology

The (i)SIMPLE is a self-powered microfluidic pumping technology that enables the propulsion of liquids through microchannels without the need for any external equipment. By using the capillary wicking properties of a sacrificial working liquid (colored water solution) into a porous substrate (Whatman quantitative filter paper, grade 598, Sigma Aldrich), pressure differences are generated within the microfluidic channels that allow for up- or downstream liquid manipulations. The (i)SIMPLE chips are fabricated via a simple layer-by-layer lamination method, wherein a cut-out microfluidic network (in 306 μm thick double-sided pressure sensitive adhesive (PSA, 3M) with incorporated pump is sealed in between 2 polyvinyl alcohol (PVC) thin (180 μm) plastic films (Reference 5).

Example 5: Evaporation of Working Liquid Over Time

In order to activate/initiate the (i)SIMPLE pumping mechanism, a preloaded working liquid (~80 μL, Darwin microfluidic dye, 1/100 dilution in distilled water) needs to be brought in contact with the porous substrate (pump capacity of ~100 μL). In the configuration where the working liquid is pre-stored inside a working liquid channel, slow evaporation of the liquid is observed over time as can be seen in FIG. 8. As a consequence of this evaporation process, the liquid-air interface of the working liquid retracts from the tip of the paper substrate over time (FIG. 8A, dashed line). The larger this distance, the harder it becomes to activate the pumping system as the fluid displacement upon actuation needs to be equally large as the amount of liquid that has evaporated (FIG. 8B).

Example 6: Fluid Flows in a Setup without Pressure Release Channel

Figures 9, 9A, 9B, 9C:
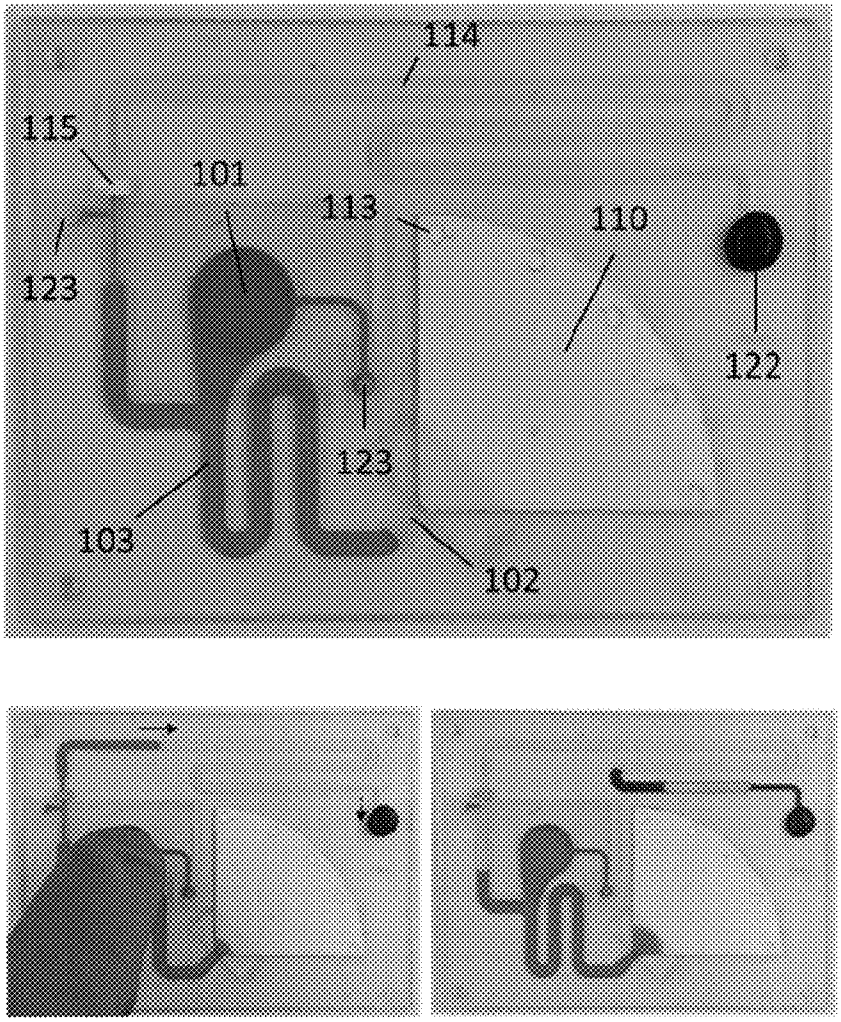
FIG. 9, including
FIGS. 9*a* to 9*c*, illustrates the activation of a microfluidic system without pressure release channel.

In order to compensate for the retracting working liquid over time, a side activation chamber holding an excess of working liquid (~40 μL), was connected to the working liquid channel (FIG. 9A). By actuation of this chamber (e.g. fingertip press), part of the liquid within the chamber is injected inside the working liquid channel and this way compensates for the evaporated working liquid, enabling good activation of the pumping system. Important here is that successful activation is only achieved as long as the amount of working liquid inside the side activation chamber is equally large or larger than the evaporated working liquid. A drawback of using an external force (e.g. finger-press actuation) to bring the working liquid in contact with the porous substrate is that excess of pressure can build up inside the working liquid channel (reference 2). This can induce backflow of working liquid towards the hydrophobic stop valve (hydrophobic treated Whatman grade 598 filter paper). As the generated pressure becomes too high, the working liquid will burst through this valve (FIG. 9B) leading to the injection of the working liquid into the connected upstream microfluidic network. As a result of the backflow air is also displaced into the microfluidic network. This can introduce problems such as the formation of air bubbles in the sample [122] or unwanted movement of prefilled liquids within the channels (FIG. 9C). An additional problem with bursting of the working liquid through the hydrophobic stop valve is that it introduces an increased resistance in order to pull the liquid through the valve what has an influence on the flow operation and properties of the pumping mechanism.

Figure 10:
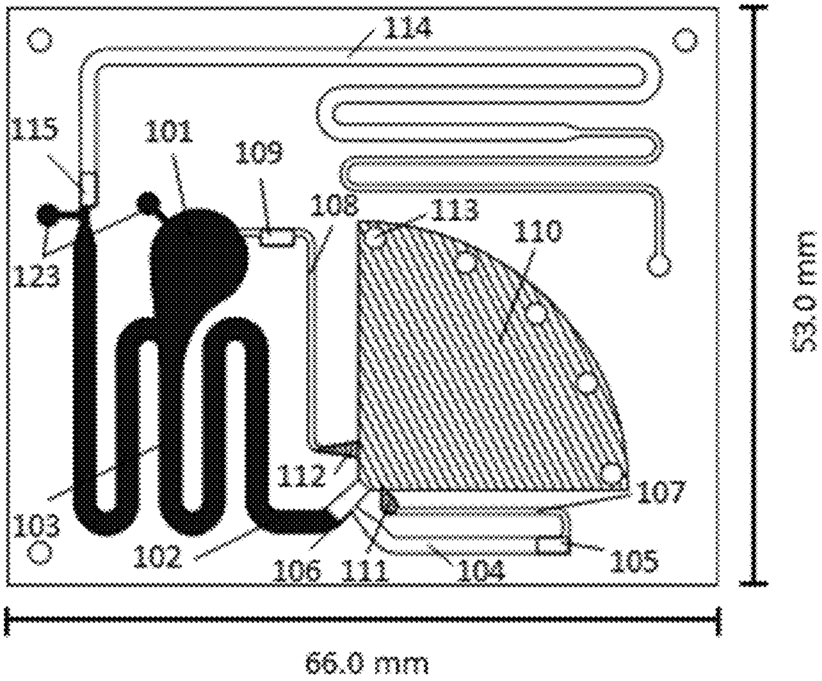
FIG. 10 represents a microfluid design comprising a pressure release channel [104] and a pressure compensation channel [108], wherein the activation chamber [101] is located laterally to the working liquid channel [102]. Black area indicates liquids, oblique dashed area indicates liquiphilic porous materials, dashed area indicate liquiphilic porous materials.

Example 7: Fluid Flows in a Setup with a Pressure Release Channel and Pressure Compensation Channel The microfluidic design of the pumping mechanism (FIG. 10) is activated by means of the application of a temporary pressure source such as a fingertip press on the activation chamber. As a result, the activation chamber is temporarily deflected and working liquid is displaced towards the porous substrate of the pumping mechanism. To prevent any back flow towards the upstream microfluidic network, a pressure release channel [104] is included into the system, which creates an additional connection between the distant part of the working liquid channel and the porous substrate. This channel enables the absorption of the excess displaced working liquid, and this way prevents the build-up of pressure within the working liquid channel. A second microfluidic channel (pressure compensation channel, [108]) is also integrated in the system that connects the side activation chamber with the porous substrate of the pump. This connection ensures that air can be drawn into the activation chamber upon releasing the temporary pressure source. From the moment the pressure is released from the activation chamber, this latter will revert to its original shape and would then induce an abrupt negative pressure into the system. The ability to pull in air from the environment through the pressure compensation channel, stabilizes the pressure balance within the working liquid channel and minimizes the effects of the release of the temporary pressure source on the connected microfluidic network. It is advantageous that both the pressure release and compensation channels are sealed as soon as possible (e.g. within few seconds) from the external environment and therefore hydrophilic porous blocking vents are foreseen which are in direct connection with the paper substrate. These are positioned at a short distance from the porous substrate of the pump mechanism and therefore become immediately saturated with working liquid. Once saturated, these vents prevent any intake of air into the pressure release or stabilizing channels. An important element is that the distance between the pump tip and the hydrophilic porous blocking vent of the pressure stabilizing channel is larger compared to the one of the pressure release channel to make sure that the air connection is still open once the pressure source is removed from the activation chamber.

In FIG. 11A the configuration with all the elements of the activation mechanism is shown while in FIG. 11B to-F the different steps of the functioning of the design are illustrated. The working liquid is displaced towards the porous pump substrate by means of a fingertip press activation (FIG. 11B). From the moment the working liquid is brought in contact with the porous pump substrate, the excess of liquid is pushed into the pressure release channel to prevent the build-up of pressure (FIG. 11C, solid arrow). The air inside the pressure release channel is pushed out of the system via the blocking vent towards the air vents. After releasing of the fingertip, the activation chamber deflect back to its original shape and air is being pulled inside the from the environment via the blocking vent of the pressure stabilizing channel which is still air open (FIG. 11D, dashed arrow). The blocking vent in the pressure release channel is already saturated with working liquid and thus sealed from air intake as no liquid movement is observed anymore within the channel. Upon saturation of the blocking vent in the pressure stabilizing channel, the working liquid in the working liquid channel is absorbed inside the porous pump material and all the generated negative is exerted on the sample leading to the withdrawal of it into the microfluidic system (FIG. 11F, solid arrow).

Example 8: Fluid Flows in a Setup with a Pressure Release Channel and a Permanent Pressure Source In this setup, the pumping mechanism is activated by inducing a fixed volume displacement of the working liquid by means of actuation of a permanent pressure source. This pressure source can be the attachment of an external piece or any other pressure source that leads to the permanent deflection of the activation chamber such as a press button or deflecting membrane. In this example a permanent pressure source functioning similarly to that of FIG. 6 is used.

Figure 12:
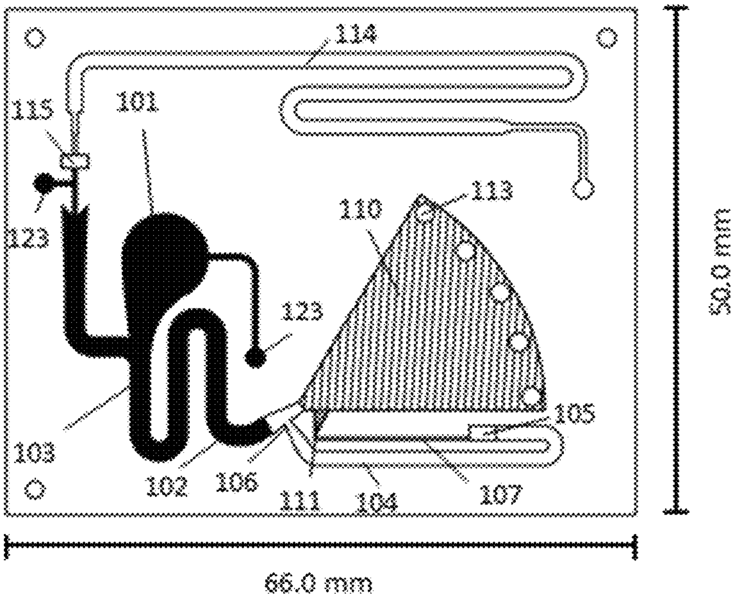
FIG. 12 represents a microfluid design with a pressure release channel [104] and without pressure compensation channel, wherein the activation chamber [101] is located laterally to the working liquid channel [102]. Black area indicates liquids, oblique dashed area indicates liquiphilic porous materials, dashed area indicate liquiphilic porous materials.

In FIG. 12 the microfluidic chip design of the activation mechanism used is illustrated. Compared to the chip design of the activation system in which a temporary activation source is used, no pressure balancing channel is required here. This is a consequence of the permanent deflection of the activation chamber avoiding the generation of an abrupt negative pressure. For pump activation, an external activation piece with protrusion [116] is placed inside the opening of the spacing element [119] on top of the activation chamber [101]. The activation piece remains fixed to the spacer by means of double-sided sticky tape [118] leading to a fixed (irreversible) deflection of the activation chamber dependent on the size of the protrusion and the height of the spacing element. The different working steps are shown in FIG. 13A to E. FIG. 13B The working liquid displacement in the working liquid channel is introduced by pushing the external piece [116], thereby attaching said external piece to the spacing element on top of the activation chamber. FIG. 13C: Upon attachment, the excess of fluid displacement is absorbed by the pressure release channel preventing the build-up of pressure within the working liquid channel. FIG. 13D Immediately after activation the blocking vent saturates, sealing off the pressure release channel from any air intake. FIG. 13E After proper sealing of the blocking vent [111], the wicking of the working liquid inside the porous substrate leads to the manipulation of the sample within the connected microfluidic network.

The invention claimed is:

1. A fluid conduit device comprising:

a capillary pump, comprising a solid sorbent enclosed in an enclosure and having an inlet and an outlet;

a fluid conduit filled with a working liquid and comprising an actuator zone and a liquid channel, wherein (i) the liquid channel is operationally connected between the actuator zone and the inlet of the capillary pump, (ii) the fluid conduit is connected to an upstream microfluidic network, and, (iii) the fluid conduit is separated from said upstream microfluidic network by a liquiphobic barrier which is permeable to air but retains liquids;

a pressure release channel, wherein one end of the pressure release channel is operationally connected to the fluid conduit at a proximity of the inlet of the capillary pump and the other end of the pressure release channel is operationally connected to the capillary pump via a liquiphilic porous blocking vent;

wherein the pressure release channel is configured to prevent a build-up of pressure within the liquid channel during actuation of the actuator zone as excess of displacement of the working liquid is directed in the pressure release channel.

2. The fluid conduit device according to claim 1, wherein the working liquid is an aqueous liquid and the liquiphobic barrier is a hydrophobic barrier which is permeable to air but retains aqueous liquids.

3. The fluid conduit device according to claim 1, wherein the working liquid is an oily liquid and the liquiphobic barrier is an oleophobic barrier which is permeable to air but retains oily liquids.

4. The fluid conduit device according to claim 1, further comprising a pressure compensation channel, wherein one end of the pressure compensation channel is operationally connected to the capillary pump via a liquiphilic porous blocking vent and the other end of the pressure compensation channel is operationally connected to the actuator zone via a liquiphobic barrier, wherein the distance of the liquiphilic porous blocking vent of the pressure release channel and the liquiphilic porous blocking vent of the pressure compensation channel from the inlet of the capillary pump are chosen such that the working liquid reaches the liquiphilic porous blocking vent of the pressure release channel prior to reaching the liquiphilic porous blocking vent of the pressure compensation channel.

5. The fluid conduit device according to claim 4, wherein the device is a microfluidic device, the liquiphilic porous blocking vent of the pressure release channel is located less than 2 mm from the inlet of the capillary pump, the liquiphilic porous blocking vent of the pressure compensation channel is located between 2 and 4 mm from the inlet of the capillary pump.

6. The fluid conduit device according to claim 4, wherein the working liquid is an aqueous liquid and the liquiphobic barrier is a hydrophobic barrier which is permeable to air but retains aqueous liquids.

7. The fluid conduit device according to claim 4, wherein the working liquid is an oily liquid and the barrier is a oleophobic barrier which is permeable to air but retains oily liquids.

8. The fluid conduit device according to claim 1, further comprising a permanent pressure source suitable for actuation.

9. The fluid conduit device according to claim 8, wherein a liquid storage container functions as the permanent pressure source.

10. A method for activation of a fluid conduit using the device according to claim 1, the method comprising providing a pressure on the actuator zone, thereby allowing activation of the capillary pump by diverting excess working liquid temporarily into the pressure release channel until the liquiphilic porous blocking vent is saturated.

11. The method according to claim 10, wherein a pressure compensation channel allows compensating for pressure imbalance introduced after removal of a pressure source exerted on the actuator zone by allowing inflow of air after removing the pressure source from the actuator zone.

* * * * *